United States Patent Office 3,515,707
Patented June 2, 1970

3,515,707
METAL DERIVATIVES OF NOVEL SATURATED HETEROCYCLIC POLYMERS
Herbert K. Reimschuessel, Morristown, N.J., and Franklin Boardman, Ossining, N.Y., assignors to Allied Chemical Corporation, New York, N.Y., a corporation of New York
No Drawing. Filed Feb. 16, 1967, Ser. No. 616,482
Int. Cl. C08f 3/90, 3/81, 5/00
U.S. Cl. 260—89.7           2 Claims

ABSTRACT OF THE DISCLOSURE

N,N-diallyl-α-amino carboxylic acids and N,N-diallyl quaternary ammonium compounds may be free radical polymerized to form saturated heterocyclic polymers with functional side chains. These polymers form metal chelate complexes.

---

This invention relates to novel polymers derived from N,N-diallyl-α-amino carboxylic acids, to novel N,N-diallyl-substituted quaternary ammonium monomers and polymers derived therefrom, and to novel metal chelates of both of these classes of polymers.

The novel polymers of the invention have recurring units of the formula

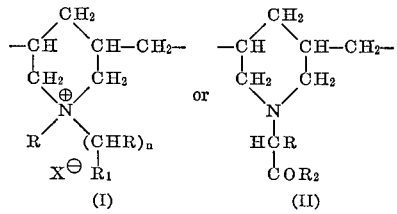

wherein R at each occurrence is a member independently selected from the group consisting of hydrogen and saturated alkyl radicals having from 1 to 18 carbon atoms; $R_1$ is a member selected from the group consisting of —$COR_2$ and —CN radicals; $R_2$ is a member selected from the group consisting of —OH, —X, —NHOH, —$NHNH_2$, —$NH_2$, —NHR and —OR radicals where R has the meaning given above; X is a halogen selected from the group consisting of chlorine and bromine; and $n$ is an integer from 1 to 20.

The polymers of the present invention are useful intermediates and auxiliaries for applications in the fields of paints, coatings, adhesives, textiles, plastics, pharmaceuticals, photographic elements, flocculation agents and electrically conductive papers and cloths.

It is known (U.S. Pat. 2,926,161) that certain diallylamine derivatives can be polymerized to form linear macromolecules the structure of which may be represented by the general formula

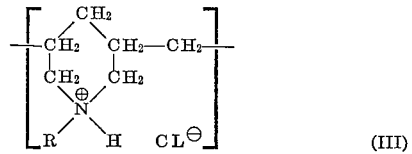

wherein R is hydrogen or alkyl.

The polymers of the present invention are markedly different from these known materials in that they contain functional side chains which can react chemically to fundamentally modify the structure and physical and chemical properties of the parent polymer. In addition, we have discovered that the polymers of our invention, unlike the polymers of structure III known to the prior art, will react with metal ions in solution to form polymer-metal chelates.

It is a primary objective of this invention to provide novel polymers which have side chains containing functional groups which undergo a wide variety of chemical reactions including chelate formation. The broad versatility of the polymers of our invention results from the fact that the physical and chemical properties of the parent polymer may be readily and significantly altered simply by reaction of the side chain functional group. It is therefore possible to essentially "tailor make" polymers possessing the physical and chemical properties desired for any particular application.

It is another object of this invention to provide novel monomers useful in the preparation of the aforementioned polymers of structure I. It is still another object of this invention to provide novel polymers of structure II.

It is a further object of this invention to provide novel polymer-metal chelate complexes which are useful as semiconductors using polymers of structures I and II. Further objects and advantages will become apparent from the description of the invention which follows in greater detail.

It has now been found in accordance with this invention that novel polymers which may be represented by the formula

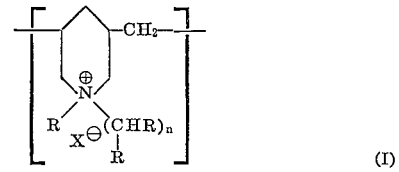

may be prepared by free radical polymerization of novel quaternary ammonium monomers of the structure

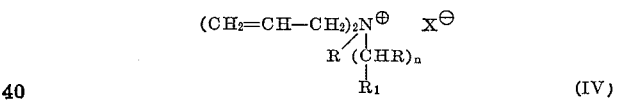

wherein R, $R_1$, X and $n$ have the meanings heretofore assigned. These novel monomers may be prepared using known synthetic organic procedures.

According to one method, diallylamine or an N-alkyl substituted diallylamine is condensed with a halocarboxylic acid, ester or nitrile such as chloro- or bromoacetic acid, their homologs, methyl or ethyl bromoacetate, chloroacetonitrile and the like, in any inert solvent. The reaction may be carried out conveniently at room temperature, but higher temperatures up to the reflux temperature of the solution may also be employed. The preferred reaction temperature is from 40° C. to 70° C. The time required for reaction will vary with the temperature used, the reactivity of the starting materials, etc., but a good yield of the diallylamine quaternary ammonium halide product is generally obtained after stirring for from about 12 to about 24 hours. In some cases a longer period may be required. The product can be isolated from the reaction mixture and purified in any convenient manner, as by recrystallization from a suitable solvent.

Alternatively, diallylamines may be reacted with an α,β-unsaturated acid, ester or nitrile to form the corresponding tertiary amine. Suitable α,β-unsaturated compounds include acrylic acid, methyl acrylate, ethyl acrylate, acrylonitrile, and their alkyl derivatives. When reaction is substantially complete, the tertiary diallylamine may be isolated in any convenient manner. The corresponding quaternary ammonium salt may then be prepared by further reaction of the tertiary diallylamine with a hydrogen halide or an alkyl halide. The resulting quaternary ammonium salt may be purified if desired by recrystallization from an appropriate solvent.

It has also been found in accordance with this invention that the novel polymers having the structure

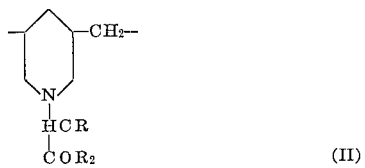

(II)

may be prepared by polymerization of N,N-diallyl-α-amino carboxylic acids followed by reaction of the acid moiety of the polymer, if desired.

Although such N,N-diallylamino carboxylic acids may be in equilibrium with their internal quarternary ammonium salts, as shown below,

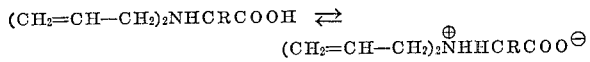

it was expected that polymerization would be inhibited by the tertiary amine present in this equilibrium. It was unexpected, therefore, to discover that compounds such as diallylglycine will polymerize readily according to the process set forth below in detail.

These tertiary diallylamine carboxylic acids can be prepared by conventional methods or in accordance with a process disclosed by F. Boardman in a copending application Ser. No. 554,291, wherein an α-halogen-substituted carboxylic acid is condensed in the presence of at least two equivalents of secondary amine for each equivalent of the halogen-substituted carboxylic acid in the absence of a solvent. The resultant amino acid salt is neutralized by adding one equivalent of an alkali metal hydroxide in solution for each equivalent of the halogen acid present initially. In this manner the free diallyl amino acid can be isolated directly from the reaction mixture.

In preparing the novel polymers of our invention of structures I and II, the hereinbefore-described monomers are polymerized by standard free-radical polymerization techniques.

The monomers may be dissolved in a polar solvent such as water, dimethylsulfoxide, dimethylformamide, the lower alkanols, dioxane, the glycol ethers, and other solvents of like polarity containing a free radical catalyst.

Most free radical catalysts are suitable as polymerization initiators. In particular, peroxides including inorganic peroxides such as hydrogen peroxide and barium peroxide, organic peroxides such as tertiary butyl hydroperoxide, cumene hydroperoxide, acetyl peroxide, and benzoyl peroxide, peracids such as peracetic acid and perbenzoic acid, are useful. In addition, other free radical catalysts may be employed such as azobisisobutyronitrile. The amount of catalyst used is not critical, but, in general, an amount of from about .5% up to about 5% by weight of the monomer present is preferred in order to obtain a good rate of polymerization.

The temperature of the reaction can vary from about 0° C. to about 100° C. but the preferred range is from about 50° C. to about 80° C. However, the temperature is not critical and generally any temperature below the decomposition temperature of the polymer can be employed. The polymerization can be carried out most conveniently at atmospheric pressure, but autogenous pressure can also be used. An inert atmosphere is preferred during the polymerization to avoid the formation of undesirable by-products.

The polymers of structures I and II of this invention undergo reactions which are typical of the particular functional groups on the polymer side chains. Such reactions include esterification, and ammonolysis with ammonia or amines to form the esters or amides, reaction of esters with hydrazine to form the corresponding hydrazide; saponification and ester interchange reactions of esters, and the like.

Thus, for example, to prepare the polymers of this invention wherein $R_2=$—X, —NHNH$_2$, —NHOH, —OR, —NH$_2$, or NHR, the polymers produced by the polymerization of tertiary diallylamine—α-carboxylic acids or esters or the monomers of structure IV wherein R$_2$ is OH may be further reacted with alcohols, hydrazine, hydroxylamine, ammonia, amines, and the like, to afford the corresponding ester, hydrazide, hydroxamic acid, or amide.

The polymer-chelate complexes of this invention are formed by admixing a solution of polymer of structure I or II with an ionizable metal salt. The polymer is dissolved in water at a concentration of from about 10% up to about 80% by weight, preferably from about 30% to about 60% by weight, and the metal salt is added either as a solid or as an aqueous solution. Upon evaporation of the solvent, clear transparent films of the polymer-chelate complex are obtained having a color characteristic of the metallic chelate present. Suitable metal salts include the nitrates of aluminum, magnesium, calcium, cadmium, barium, tin, lead, chromium, molybedenum, tungsten, manganese, iron, cobalt, zinc, copper silver, gold, and mercury; the chlorides of magnesium, cadmium, cobalt, nickel, copper, manganese, barium, aluminum (hydrated), chromium (hydrated), iron and zinc; and the carbonates of copper, magnesium, silver, calcium, barium and lead.

The following specific examples further illustrate our invention. (All parts are parts by weight unless otherwise expressly noted.) Various modifications will be apparent to one skilled in the art, and it is not intended that this invention be limited to the details in the specific examples presented by way of illustration. Accordingly, the scope of the invention is limited only by the appended claims.

EXAMPLE 1

To a solution containing 0.10 mol of methyl diallylamine in 25 ml. of ether, 0.10 mol of ethyl bromoacetate was added. A yellow oil separated out almost immediately. After standing for 16 hours, the supernatant liquid was decanted and the oil washed with ether until it begain to crystallize. The product was recrystallized from tetrahydrofuran.

A 40% by weight yield of methyl diallyl carbethoxymethyl ammonium bromide was obtained having a melting point of 60°–70° C.

*Elemental analysis*: Calculated for $C_{11}H_{20}BrNO_2$ (percent): C, 47.5; H, 7.21; Br, 28.75; N, 5.04. Found (percent): C, 47.22; H, 7.16; Br, 28.85; N, 5.13.

EXAMPLE 2

Five drops of tertiary butyl hydroperoxide were added to a solution containing 10 grams of methyl diallyl carbethoxymethyl ammonium bromide, as prepared in Example 1, and 5 grams of water. The solution was kept at 65° C. for 48 hours under a nitrogen atmosphere. The clear viscous solution was evaporated under vacuum leaving a sticky oil. This oil was refluxed in acetone for 2 hours and dried under vacuum.

A yield of 100% by weight of solid poly-[(3), 5-methylene - N-methyl - N-carbethoxymethylpiperidinium bromide] was obtained. The polymer softened at 62° C. and evolved a gas when heated to 130° C. The reduced viscosity of the polymer as determined on an 0.5% by weight solution in water was 0.24.

EXAMPLE 3

Poly-[3,(5)-methylene - N-methyl - N - carbethoxymethylpiperidinum bromide] was prepared following the procedure of Example 2 using 0.32 gram of azobisisobutyronitrile as catalyst.

The product was obtained as a solid foam softening at 62° C. and evolving a gas at 130° C. The reduced viscosity of an 0.5% solution in water was 0.60.

EXAMPLE 4

One mol of diallylamine was dissolved in 20 ml. of ethanol and one mol of methyl acrylate was added dropwise. After standing for two days, the solution was distilled under vacuum and the fraction boiling at 45°/0.2 mm. was collected.

A 98% yield of methyl-3-diallylaminopropionate was obtained. A 10% by weight solution of this product in anhydrous diethyl ether was prepared and anhydrous hydrogen chloride was passed through until precipitation appeared complete. The precipitate was filtered, washed with ether, and recrystallized from acetone-ether solution.

Methyl - 3-diallylaminopropionate hydrochloride was obtained in 67% yield.

*Elemental analysis:* Calculated for $C_{10}H_{18}ClNO_2$ (percent): C, 54.7; H, 8.2; N, 6.4; Cl, 16.2. Found (percent): C, 54.5; H, 8.08; N, 6.4; Cl, 15.9.

EXAMPLE 5

A solution was prepared containing 4 grams of methyl-3-diallylaminopropionate hydrochloride, as prepared in Example 4, and 2 grams of water. 0.15 milliliter of tertiary-butyl hydroperoxide was added and the solution maintained at 70°–80° C. for three days under a nitrogen atmosphere. The resultant viscous solution was evaporated to an oil which was refluxed in acetone for two hours. The solvent was decanted and the oil dried at 25° C./0.1 mm.

Poly-[(3), 5-methylene-N-$\beta$-carbomethoxyethyl piperidinium chloride] was obtained as a solid foam which softened at 70° C. and evolved a gas when heated to 130° C. Its reduced viscosity as determined on an 0.5% solution in water was 0.21.

EXAMPLE 6

Reaction of methyl diallylamine with $\omega$-bromo methyl laurate according to the procedure of Example 1 affords a 28% yield of methyl diallyl-($\epsilon$-carbomethoxy) undecyl ammonium bromide, which when polymerized in accordance with the procedure of Example 2 affords a quantitative yield of poly-[(3),5-methylene-N-methyl-N-($\epsilon$-carbomethoxy) undecyl piperidinium bromide] as a gummy solid. The reduced viscosity of the polymer as determined on an 0.5% aqueous solution is 0.2.

EXAMPLE 7

Methyl diallylamine and 2-bromo ethyl laurate are condensed at 70° C. to afford a 31% yield of diallyl ($\alpha$-carbethoxy, $\alpha$-decyl) methyl-ammonium bromide, which is polymerized using azobisisobutyronitrile catalyst to afford a quantitative yield of poly-[(3),5-methylene-N-($\alpha$-carbethoxy, $\alpha$-decyl) methyl piperidinium bromide].

EXAMPLE 8

A mixture of 1.00 part of chloroacetonitrile and 1.47 parts of methyldiallylamine was kept at 100° C. for two hours under an inert atmosphere excluding air and water. The mixture was then cooled to 25° C. and left at that temperature for 16 hours. The resulting oil was dissolved in chloroform (the minimum amount) and precipitated with diethyl ether (excess). The ether layer was decanted and the chloroform-ether treatment repeated three times. The oil could not be crystallized, however. The oil was dried for two hours at 50° C./0.1 mm. pressure. A yield of 2.38 parts (97% of theoretical) of methyl cyanomethyl diallyl ammonium chloride was obtained.

To a solution of 30 parts of methyl cyanomethyl diallyl ammonium chloride in 30 parts of water under an inert atmosphere excluding oxygen was added 1.0 part of 2,2' azobis (2-methyl-propionitrile). The mixture was kept at 60–70° C. for four days.

The resultant yellow-red solution was evaporated to dryness leaving a red oil. The oil was extracted with chloroform to remove unreacted monomer, and then evaporated to dryness at 50° C./0.1 mm. A yield of 20 parts (67%) of poly-[3,(5)-methylene-N-cyanomethyl-N-methyl-piperidinium chloride] was obtained.

EXAMPLE 9

Four grams of N,N-diallylglycine, 2 grams of water and 2 drops of tertiary-butyl hydroperoxide were mixed and maintained at 65° C. for three days under a nitrogen atmosphere. The solvent was evaporated under vacuum leaving a yellow solid which was extracted with boiling ethanol.

Poly-[(3),5-methylene - N - carboxymethylpiperidine] was obtained as a solid melting above 360° C. Some decomposition was noted at 200° C. Its reduced viscosity as determined on an 0.5% solution in water was 0.24.

The polymer was soluble in water, formic acid and trifluoroacetic acid and insoluble in pyridine and dimethylformamide. A yellow transparent film was cast from an aqueous solution.

EXAMPLE 10

N,N-diallyl-$\alpha$-aminobutyric acid is polymerized in accordance with the procedure of Example 9 to afford poly-[(3),5-methylene - N-($\alpha$-carboxy-$\alpha$-ethyl) methylpiperidine] as a viscous brown oil. Refluxing of this polymer with a solution of methyl amine in toluene affords the corresponding polyamide in 36% yield.

EXAMPLE 11

A portion of 33% aqueous solution of poly-[(3),5-methylene-N-carboxymethylpiperidine], as prepared in Example 9, was added to an equal amount of solution of silver nitrate. A clear colorless solution formed. When the solvent was evaporated, a clear colorless, water-insoluble film was obtained.

The experiment was repeated using a solution of ferric chloride. The resultant clear wine-colored solution was evaporated to afford a transparent, water-insoluble, wine-red film.

When a portion of the polymer solution was added to a green suspension of cupric carbonate in water and heated to boiling for 15 minutes, a blue precipitate formed indicating the formation of a cupric chelate of the polymer.

EXAMPLE 12

A 25% by weight aqueous solution of ferric chloride was added to an equal volume of a 50% by weight solution in water of poly-[(3),5-methylene-N-methyl-N-carbethoxymethyl-piperidinium bromide], as prepared in Example 3. The yellow solution turned red, and on evaporation of the solvent a clear wine-red film was obtained.

The experiment was repeated using a 33% cupric chloride solution. A blue solution was obtained which, after evaporation of the solvent, left a clear blue film.

A portion of the polymer was added to an equimolar amount of silver nitrate. Silver bromide precipitated, and on evaporation of the solvent a gray opaque film was obtained. A mixture containing 2 mols of polymer to 1 mol of silver nitrate was mixed and exaporated affording a partially transparent film. On heating for 12 hours, the proportion of transparent to opaque areas increased.

EXAMPLE 13

A 1:2 molar ratio of poly-[(3),5-methylene-N-methyl-N-carbethoxymethylpiperidinium bromide], as prepared in Example 3, and hydrazine were refluxed for two hours in ethanol and allowed to stand overnight, A clear viscous oil separated out. The supernatant liquid was decanted and the oil washed with ethanol and dried at 35° C./0.1 mm.

A 100% yield of poly-[(3),5-methylene-N-methyl-N-carbohydrazinomethylpiperidinium bromide] was obtained as a solid foam. The polymer decomposed at 220° C. It had a reduced viscosity as determined on an 0.5% weight solution in water of 0.54. The polymer was soluble in p-cresol and formic acid and insoluble in dimethylformamide and chloroform.

*Elemental analysis*: Calculated for $C_9H_{18}BrN_3O$ (percent): C, 40.9; H, 6.8; Br, 30.3 N, 15.9. Found (percent): C, 42.4; H, 7.3; Br, 30.8; N, 16.1.

We claim:

1. Novel polymeric metallic chelates obtained by a process which compries admixing an aqueous solution of a polymer having recurring units selected from the group consisting of

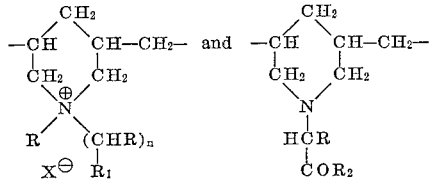

wherein R at each occurrence is a member independently selected from the group consisting of hydrogen and alkyl radicals having from 1 to 18 carbon atoms; $R_1$ is a member selected from the group consisting of —$COR_2$ and —CN radicals; $R_2$ is a member selected from the group consisting of monovalent —OR, OH, X, —NHOH, —$NHNH_2$, —$NH_2$ and —NHR radicals wherein R has the meaning given above; X is a halogen selected from the group consisting of chlorine and bromine; and $n$ is an integer from 1 to 20 at a concentration of at least 10% up to about 80% by weight of the polymer with an ionizable metal salt.

2. Polymeric films obtained by a process which comprises admixing an aqueous solution of a polymer and an ionizable metal salt in accordance with claim 1 and evaporating the solvent.

References Cited

UNITED STATES PATENTS

| 2,926,161 | 2/1960 | Butler et al. | 260—89.7 |
| 3,375,233 | 3/1968 | Harada et al. | 260—79.3 |

FOREIGN PATENTS

| 1,485,796 | 5/1967 | France. |
| 664,427 | 9/1965 | Belgium. |

OTHER REFERENCES

Szmant, H. H., Organic Chemistry, Prentice Hall, pp. 399, 400, 402 (1957).

JOSEPH L. SCHOFER, Primary Examiner

C. A. HENDERSON, Jr., Assistant Examiner

U.S. Cl. X.R.

117—139.5, 152, 160; 252—518, 519, 521; 260—2.1, 78.4, 80, 88.3, 88.7, 89.1, 567.6, 583; 162—138